(12) United States Patent
Harvey

(10) Patent No.: US 7,196,661 B2
(45) Date of Patent: Mar. 27, 2007

(54) SECURITY SYSTEM INCLUDING A METHOD AND SYSTEM FOR ACQUIRING GPS SATELLITE POSITION

(76) Inventor: A. Stephen Harvey, 33545 Second Avenue, Mission BC (CA) V2V 6J3

( * ) Notice: Subject to any disclaimer, the term of this patent is extended or adjusted under 35 U.S.C. 154(b) by 193 days.

(21) Appl. No.: 10/867,320

(22) Filed: Jun. 14, 2004

(65) Prior Publication Data

US 2004/0252053 A1    Dec. 16, 2004

Related U.S. Application Data

(60) Provisional application No. 60/478,272, filed on Jun. 13, 2003, provisional application No. 60/478,727, filed on Jun. 13, 2003.

(51) Int. Cl.
*G01S 1/00* (2006.01)
(52) U.S. Cl. .................................. 342/357.15
(58) Field of Classification Search .......... 342/357.06, 342/357.09, 357.12, 357.15; 701/213, 215
See application file for complete search history.

(56) References Cited

U.S. PATENT DOCUMENTS

| | | | | |
|---|---|---|---|---|
| 5,477,458 A | * | 12/1995 | Loomis | 701/215 |
| 5,650,770 A | * | 7/1997 | Schlager et al. | 340/573.1 |
| 5,793,813 A | * | 8/1998 | Cleave | 375/259 |
| 6,239,700 B1 | * | 5/2001 | Hoffman et al. | 340/539.13 |
| 6,518,889 B2 | * | 2/2003 | Schlager et al. | 340/573.1 |

* cited by examiner

*Primary Examiner*—Dao L. Phan
(74) *Attorney, Agent, or Firm*—The Nath Law Group; Robert P. Cogan

(57) ABSTRACT

A security system and a method and apparatus utilize a transmitter and a receiver with a GPS sub-system in a GPS appliance. Ephemeris and almanac data are updated at preprogrammed times within coordinated windows of opportunity. Each GPS receiver is preferably kept in an inactive state to reduce power consumption except at the preprogrammed times and uses time-compressed formats of GPS ephemeris data. An additional receiver makes possible the use of a coordinated window of opportunity whereby the receiver is set to an active state to receive complete ephemeris data sets when transmitted. The security system monitors conditions. Security sensors may respond to a condition to "awaken" a transmitter that may then transmit a report providing the location of the appliance. The report may include manifest information such as the identity of a container to which the GPS system is affixed, the sensor reporting the breach and its location.

15 Claims, 7 Drawing Sheets

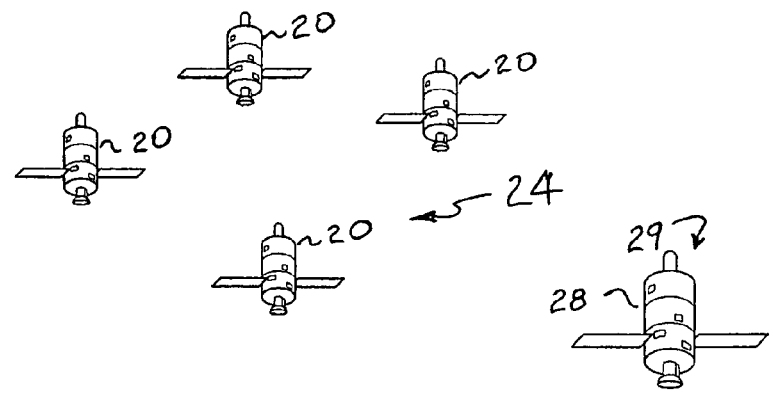
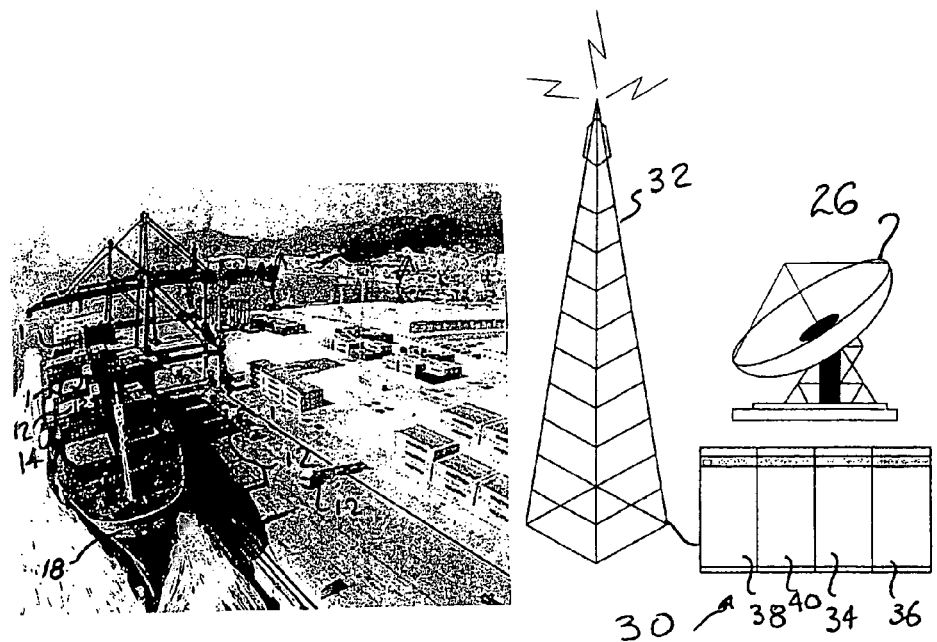
FIG. 1

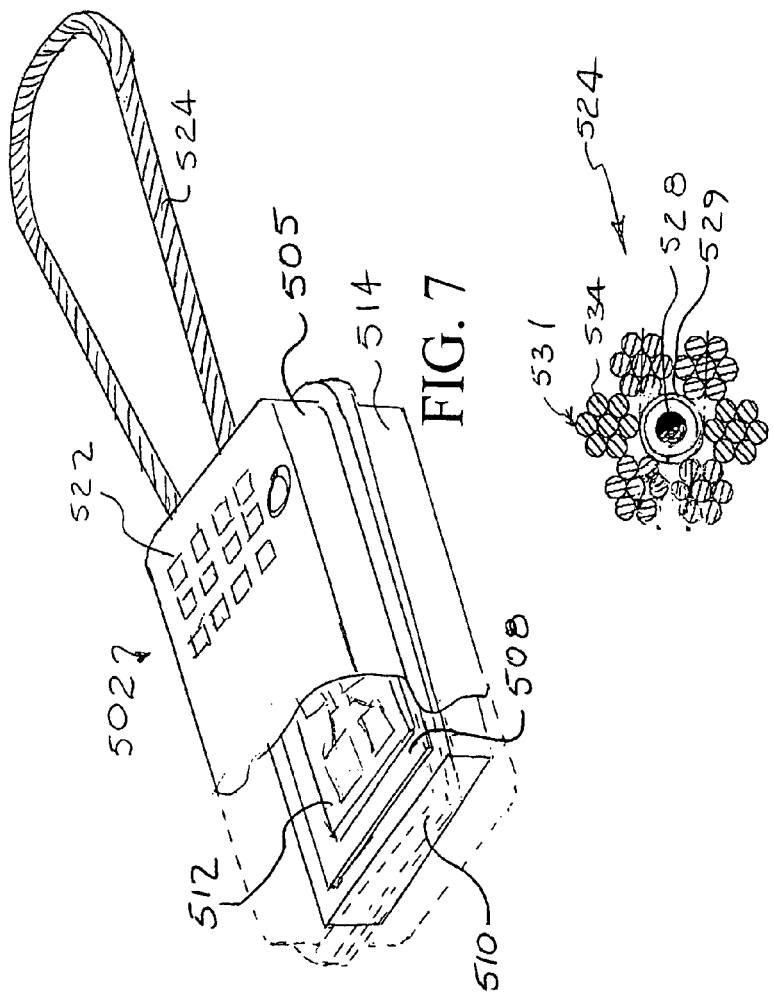

SECURITY SYSTEM INCLUDING A METHOD AND SYSTEM FOR ACQUIRING GPS SATELLITE POSITION

CROSS REFERENCE TO RELATED OF APPLICATIONS

This applications claims priority from U.S. Provisional Patent Applications 60/478,272 and 60/478,727 each filed Jun. 13, 2003, each incorporated herein by reference.

FIELD OF INVENTION

The present invention relates generally to a Global Positioning System (GPS) method and apparatus designed to acquire GPS Ephemeris Data at an accelerated rate, providing the fastest Time-to-First-Fix (TTFF), and a novel type of security system incorporating such a GPS method.

BACKGROUND OF THE INVENTION

An important application of the global positioning system enables users to determine the remote location of assets, that incorporate a transceiver, through an appropriate software application. For example, a surface transport tractor-trailer may automatically report its position to a proprietary dispatch system, determining position via the GPS constellation. The GPS constellation is a group of at least 24 GPS satellites, currently 28 GPS satellites, that orbit the earth and provide location information to GPS systems. Another application provides location determination capabilities for cellular phones for the United States Federal Communications Commission (FCC) wireless Enhanced 911 (E911) program. In order to report its position, a remote unit must "know" where it is. In order to do this, the remote unit acquires its position through interaction with a minimum of four GPS Satellites.

The NAVSTAR (Navigation Satellite Timing and Ranging) Global Positioning System is a space-based radionavigational system that provides a dual-use global positioning and navigation service to military and civilian users. NAVSTAR is managed by the Interagency GPS Executive Board (IGEB), and is co-chaired by the United States Department of Defense and the United States Department of Transportation. Information is based on a nominal 24-satellite constellation at an altitude of 20,184 m, with satellites distributed equally in six orbital planes separated by 60°. The array of satellites is known as the GPS constellation. Signal services provided are L1-C/A at 1575.42 MHz and L2-C/A at 1227.6 MHz. Additionally, a new L2 Civil Signal (L2CS) at 1227.6 MHz will become operational by 2008 and a Safety-of-Life signal L5 at 1176.45 MHz is intended to be operational by 2013. The civilian GPS standard positioning service (GPS-SPS) is designed to provide global coverage with between five and eight visible satellites from any location. Global availability averages better than 99.94%.

The NAVSTAR System uses two techniques to improve GPS receiver performance; Code Division Multiple Access (CDMA) as a means to allow different satellites to transmit on the same frequency with limited interference, and direct sequence-spread spectrum (DSSS) as a means to increase resistance to interference and recover damaged ranging data. The GPS broadcast has three components: Carrier Wave, Ranging Codes and Navigation Message. The NAVSTAR System operates at a system dock frequency of 10.23 MHz, which is a sub-multiple of the L1 carrier frequency (1575.42 MHz=154 *10.23 MHz). The GPS L1 carrier broadcast message is the modulo-2 spread of the 50 bps NAV bit-train and a Pseudorandom Noise (PRN) Code. PRN-Codes have the characteristics of random noise, but are a sequence defined by a 1023-chip maximal sequence Bi-Phase Shift Key (BPSK) modulation (i.e. alternating 1s and 0s). PRN-Code sequences are generated with two 10-bit Linear Feedback Shift Registers (LFSRs); the output is combined by an exclusive-OR (XOR) addition; the signal advances with each new value created during the dock cycle.

Thirty-six unique PRN-sequences (also known as Gold-Codes) may be generated in this manner, ensuring that no two PRN-sequences will match. PRN-Code sequences depend on the G2-register "tap" combinations (or seed values) used to initialize the operation, and the G1-register polynomial that defines the LFSR. Code-correlating receivers extract the Navigation Message from the Carrier by generating PRN reference sequences to identify SVs by PRN-Code matches. When the patterns are synchronized the receiver mathematically extracts the embedded Navigation Message by modulo-2 recovery from the carrier link frequency. The C/A-Code provides an unambiguous reference for a receiver to determine carrier signal travel-time (by clock offset); as well as, pseudorange based on the C/A-Code "chip-period." Mobile receivers use satellite ephemeris (Keplerian parameters) broadcast in the Link Carrier Frequency as their reference for determining satellite position, when used in conjunction with pseudorange, enables PVT Solution. NAVSTAR data broadcasts contain satellite ephemeris parameters based on the U.S. military World Geodetic System (WGS-84 G1150). Reference frame receiver calculations are based on Earth-Centered Earth-Fixed (ECEF) (X,Y,Z,t) Coordinates. A GPS Solution is transformed automatically in a single-step to the more intuitive, and more commonly used, geodetic-coordinate system of Latitude, Longitude and Altitude.

For geo-location positioning, a GPS Receiver must find and acquire signals transmitted from a minimum number of GPS Satellites, typically four, unless augmented to eliminate clock bias. Each satellite space vehicle has its own Pseudo Random Number (PRN) Code to uniquely identify it. Each satellite transmits satellite ephemeris, i.e. Keplerian parameters, and timing chip sequence enabling remote units to derive satellite pseudorange and ultimately position-velocity-time (PVT) solution. Consequently, remote units may autonomously determine their latitude, longitude and altitude, reporting the results to a user through some form of software application programming interface.

Generally, a remote unit determines the general health and relative position of the GPS Satellites through the GPS navigation messages. The GPS navigation message is a continuous 50-bits/second data stream modulated via a spread spectrum sequence onto the carrier signal of each satellite. The navigation message is a telemetry message transmitted in frames. A GPS frame is 1500 bits long, and takes 30 seconds to be transmitted. Every satellite starts transmission of a frame precisely on the minute and half minute according to its own clock. Each frame consists of five subframes. Subframe 1 includes dock correction parameters and perimeters used for correction of atmospheric delays. Subframes 2 and 3 contain high accuracy ephemeris and dock offset data. A handover data word, or HOW, is also included. Subframe 4 is reserved for special messages which may be included in the data, and subframe 5 contains Almanac data. Almanac data includes information relating to dock corrections, ephemerides (the plural of ephemeris) and atmospheric delays for the normal compliment of twenty-four satellites. This data allows the remote unit to select four satellites that will be required for calculating a navigation solution. Subframes 4 and 5 are "subcommutated." The data to be transmitted in each of subframes 1, 2 and 3 data comprises a number of bits that do not exceed the number of bits in the subframe. Therefore, subframe 1, 2 and 3 data can each be transmitted within one frame. However, a frame has sufficient length to transmit about 4% of subframe data or subframe 5 data. Consequently, 25 consecutive frames of subframe 4 and 5 data must be collected before the receiver has all of the unique data content being transmitted by a satellite.

Typically, uploads are provided to a GPS satellite once every 24 hours. A Master Control Station (MCS) sends the satellite all the data that the satellite will transmit during the next 24 hours and may also include data for a time period going farther out. An upload contains roughly 16 subframe 1, 2, and 3 data sets. Each subframe 1, 2 and 3 data set is transmitted for up to two hours. The MCS is operated by the United States Air Force $50^{th}$ Space Wing's $2^{nd}$ Space Operations Squadron at Schriever AFB, Colorado.

In order to acquire the satellite position, a remote receiver must receive the ephemeris and Almanac data. Based on the amount of data and the 50-bits/second data rate, a nominal transfer time is 90 seconds for ephemeris data and 12½ minutes for an Almanac. A receiver must be powered during the time it is receiving the GPS data. The current generation GPS tracking systems on trucks have a hard-wired vehicle power-source with battery back up; in general, supplying power to this type of system is not an issue. Cellular phones are periodically recharged by a user. Therefore, GPS functionality is easily included in a cellular phone that will be frequently recharged. Again, supplying the GPS system is not an issue.

However, it may be desired to place a GPS system in an application in which the system is not going to be powered by a battery that is substantially continuously recharged or in which the system will not be attended by a user for recharging. Power requirements take on a new significance. Batteries must be provided whose capacity, and hence size and expense, must be increased commensurate with the desired length of operation of the system between maintenance intervals. Expense and reliability issues are multiplied when a number of assets are temporarily stored at one location. Where assets need to be tracked separately by a GPS device associated with each item.

The prior art has traditionally required several minutes for a GPS device to orient itself after a "cold start." The requirements for extended operation of the device to formulate its position after a "cold start," continuous tracking or position updating greatly increase the amount of power required. Prior art attempts try to achieve power savings have included semiconductor sub-miniaturization and selecting the slowest possible embedded processors. This approach is inherently flawed and will not enable wireless untethered GPS appliances due to slow performance, requiring long times-to-first-fix TTFF. Such a device must, therefore, track continuously with all internal clocks operating; to power-down the internal clocks and power-up requires an additional waiting period.

Devices including GPS technology have been utilized for remotely reporting location information by users or Software Application Programming Interface. They may also report other information. These devices do not address the power requirement issues relating to the operational requirements of GPS or the transmitter power budget for transmitting location information. The above-discussed transportation location systems have not traditionally included security features to prevent improper modification of location information sent by a GPS station to a base station.

Also, above-discussed transportation location systems have not traditionally included security features to prevent improper modification of location information sent by a GPS appliance to an end-user or operational control center. The prior art has required that that the ephemeris data transmitted by the GPS Constellation be provided to calculate a PVT Solution.

SUMMARY OF THE INVENTION

Briefly stated, in accordance with the present invention, there are provided a security system and a method and an apparatus within the security system which includes a transmitter and a receiver with a GPS sub-system in a GPS appliance, to rapidly update ephemeris and almanac data at preprogrammed times within a coordinated window of opportunity. System operational run-time is maximized in an application requiring the use of a battery or other power source that is subject to depletion over a projected mission of the GPS appliance. A mission could comprise transport of a container, or many containers, from one port to another, wherein each container has a GPS appliance associated with it.

Each GPS appliance includes a receiver preferably kept in an inactive state. An inactive state is one in which at least one function of the GPS appliance is disabled or otherwise affected in order to reduce power consumption. The GPS appliance is further enabled to permit the use alternative formats of GPS Ephemeris data, such as, utilizing International GPS Service (IGS) Ultra Rapid Orbit Products. The complete GPS Ephemeris data-sets, such as those provided individually by the GPS Satellites at all times, may be transmitted in whole at selected times, and at a substantially higher rate than the 50 bps provided by the existing GPS constellation. An additional receiver makes possible the use of a coordinated window of opportunity whereby the receiver is set to an active state to receive complete ephemeris data sets when transmitted. Consequently, ephemeris and Almanac data may be transferred in under two seconds. The GPS sub-system may then be returned to an inactive state. Power utilization due to operating the receiver to acquire satellites is minimized. In an alternative embodiment, the positioning data may be recorded and transmitted at an elevated rate in place of, or in addition to, the Ultra Rapid Orbit products. In many applications, however, there is no need to use a signal other than the Ultra rapid orbit products data.

The security system reports general condition and security related information in response to events to a Software. Application Programming Interface or Operational Control Center along with location of the GPS appliance. Security related information is produced by condition-responsive sensors which are operative even when the GPS sub-system is in an inactive mode. The sensors may respond to a condition to "awaken" a transmitter in the system to report where a conditioned event has occurred, providing an approximate position of the appliance. The sensed condition corresponds to a security event or sensory breach. The appliance's communications may include manifest information such as the identity of a container comprising the article to which the GPS system is affixed, the sensor reporting the breach and its location. While the GPS sub-system may not have acquired the latest satellite position data, the location reported will be satisfactory for security reporting purposes.

In accordance with embodiments of the invention and method, ephemeris data transmitted by the GPS Constellation is provided by an alternate means by the invention to calculate a PVT Solution.

While this Summary of the Invention lists various aspects of varying embodiments of the present invention, there are other aspects of the present invention, or preferred embodiments thereof, apparent from the following description. This Summary is neither exhaustive nor intended to be determinative of the scope of the invention.

BRIEF DESCRIPTION OF THE DRAWINGS

The invention may be further understood by reference to the following description taken in connection with the following drawings.

FIG. 1 illustrates a deployed security system;

FIG. 2 is an illustration of a security device locking a partially illustrated container, FIG. 3 consists of FIGS. 3 and 3b in which

FIG. 7 is an axonometric illustration of an embodiment of a security device;

FIG. 8 is an illustration of a wire rope assembly that can cooperate with a condition-responsive sensor circuit;

DETAILED DESCRIPTION

Figure 2:
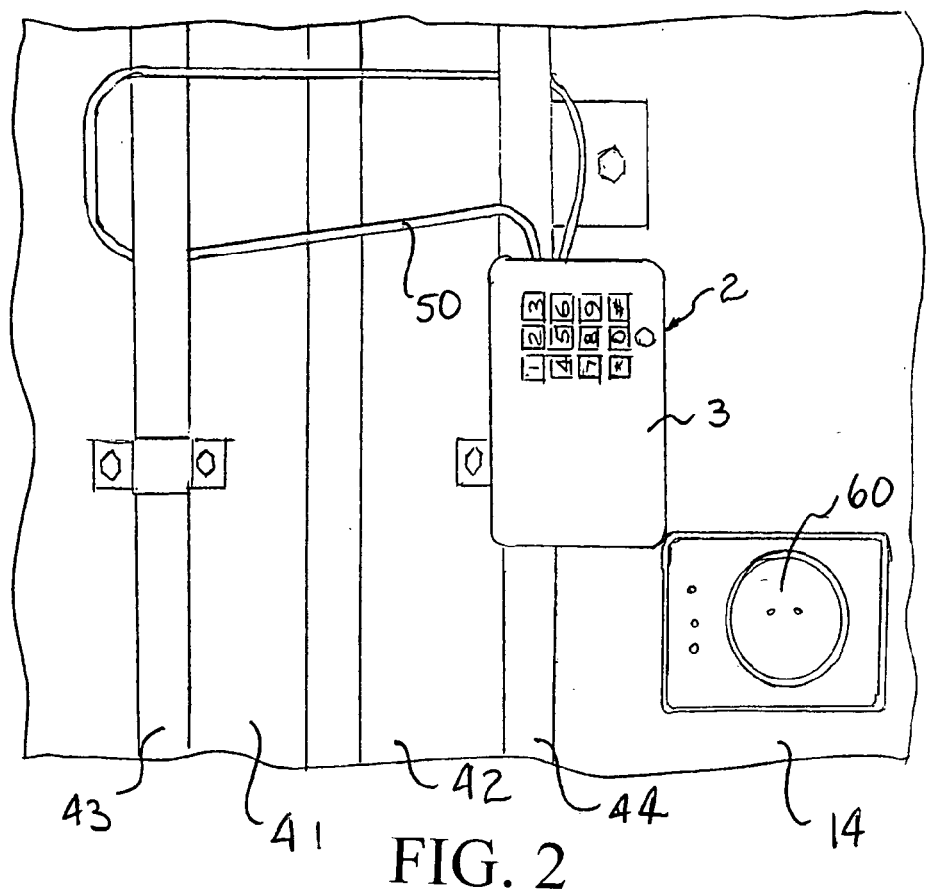

Embodiments of the present invention will have applications in high security applications. "High Security" is used here to describe practices of United States Federal Information Processing Standards (FIPS) for handing sensitive information and International Standards Organization (ISO) security policy assurance with formal hardware assessment. The embodiments may be used in providing systems and methods that take into account formal evaluation of security functions and tamper resistance mechanisms under the Common Criteria Evaluation and Validation Scheme (CCEVS), originally created by the National Security Agency. The embodiments are suitable enable a user to provide high security to others by providing a trusted third party services enterprise. The enterprise may provide security services facilitating secure communications, access control with authentication, data management and incident reporting with means of non-repudiation like time-stamped activities.

IT Security is a risk management strategy intended to prevent unauthorized system access and activities, while mitigating interruptions to critical business processes. No single policy or practice can protect against all vulnerabilities; but combined technologies used with security policies can reduce the likelihood of security breaches to highly improbable. Contemporary Security is an evolutionary process incorporating Knowledge-Based Risk Management and proven technologies as with the new International Maritime Organization (IMO) regulation requiring Automatic Information Systems in certain ships by July 2004.

Embodiments of the present invention seek to avoid limitations of prior art devices due to a variety of factors that can impede performance. These factors include function, power consumption, cost, size, reliability and availability. GPS systems may also be affected by line-of-sight restrictions due to satellite signal blockage by obstructions or terrain, coupled with the large power requirements of wireless transmitters and semiconductors limits the use of technology in certain applications that are desirable but cannot be practically applied. It is desirable to provide a system that is robust event in view of these difficulties.

Embodiments of the invention address immediate and future growth needs of maritime shipping, intermodal transport, and security for customs and law enforcement organizations by restricting access to global tracked assets and providing user authentication, authorization and accounting, generally referred to as Triple-A, as a means of non-repudiation to identify those who have accessed a shipment. As further discussed below, traceable time stamps may be used as a separate means of non-repudiation for authorization and accounting purposes. The system is able to track shipments in real-time using a thin-client web-enabled system; a Trusted Third Party Services Enterprise can facilitate role-based information access for customs and law enforcement organizations to review shipment information and activity logs from the point of origin.

The device presents a high security method of for arming/disarming sequences utilizing Two-Factor Authentication requiring a Personal Identification Number (PIN) and an Electronic Token, broadly defined to include Cellular Smartphones or a suitable alternative electronic appliance. Alternatively, a one-time disarm code can be remotely established for customs and law enforcement Organizations to facilitate compliance inspections. Embodiments may transmit User IDs including a Time and Date Stamp to the Operational Control Center of a Trusted Third Party Service Database, for example at the command and control center 30 (FIG. 1), for general message distribution or maintaining incident activity logs for auditing malicious activity. The embodiments can also encrypt all wireless transmissions in accordance with Federal Information Processing Standards (FIPS) "Data Encryption Standard (DES)," or "Advanced Encryption Standard (AES), intended for processing sensitive information.

FIG. 1 illustrates a deployed security system 1. The security system 1 has at least one security device 2, further illustrated in FIG. 2, having a housing 3 and including a GPS appliance 4. In one form, the GPS appliance 4 is a high-reliability, shock-resistant GPS Security Appliance designed to operate in all harsh environments from −40° C. to +85° C. The housing 3 is preferably made of a durable impact-modified polyalloy that provides high UV, alkali, acid, hydrocarbon, and flame resistance. The housing 3 encloses all electrical components such as a printed circuit board coupled, processor RF front-end integrated circuits, antennae, sensors, and a high capacity Li-ion smart battery. In alternative modes of the invention, the system may connect to a solar cell to extend the operation, or an external hardwired power supply. An interface for shell components of the housing 3 preferably comprise an o-ring or gasket material that maintains a watertight environmental seal under all anticipated conditions, and is secured-dosed by a high-security cylindrical cam lock. A titanium structural insert may provide further anti-tamper resistance and is intended to prevent mechanical tear-out of connector assemblies. It will include redundant power and communications ensuring that the system will work as long as at least one redundant component still functions. One mode of the invention can include design components rated for military and/or aerospace standards.

Each GPS appliance 4 comprises a transmitter and receiver further described with respect to FIG. 4 below. The security device 2 acts as a monitor which responds to occurrences that affect an asset 12. Response can be provided by sensors also further described with respect to FIG. 4 below. If an unauthorized person tampers with a container while it is in transit on a long voyage, a non-repudiatable signal will be provided by the security device 2. Securing of assets having various means of non-repudiation similar to a Custodian Bond will greatly reduce security inspection time one a shipped asset 12 arrives at its destination. One form of asset 12 is a container 14 that may be loaded on a ship 15 at sea or in a port 17. Containers 14 may also be loaded on vehicles 17.

The GPS appliance 4 receives information from one or more satellites 20 in a GPS satellite constellation 24. The GPS constellation 24 is supplied with ephemeris and almanac data from a GPS Master Control Station 26, operated by the United States Air Force $50^{th}$ Space Wing's $2^{nd}$ Space Operations Squadron at Schriever AFB, Colorado. The civilian Global Positioning System—Standard Positioning Service is designed to provide coverage with five to eight visible satellites 20 from any location. Additionally, the GPS appliance 4 may communicate via a commercial satellite 28 in a commercial constellation 29 via a wireless link to a web-based Internet portal 30. Any given commercial satellite constellation 29 has ground, space and control segments with unique gateway protocols for device communications and message distribution. Alternatively, the GPS appliance 4 may communicate with an operations control center 30 that includes an antenna 32 coupled to a receiver 34 and a transmitter 36. The receiver 34 and transmitter 36 are coupled to a signal-processing computer 38, which has an interface 40. The interface 40 may allow for manipulation of signals by a user.

In embodiments of the present invention, the GPS appliance 4 may remain in an "inactive" mode except at selected times. An inactive mode is one in which power is conserved as by disabling a particular function drawing power. Forms of inactive states include "sleep," which may be defined by the particular functions disabled, or "off." In a preferred embodiment, the GPS appliance 4 is switched to an active state at prearranged timing intervals when the commercial satellites 28 transmit a complete block of ephemeris data at a prescheduled times and at a higher data rate. The most significant power consumed by mobile devices is due to communication transmissions with the least power consumption occurring in standby or sleep state. Increases in battery capacity are not always possible. The GPS appliance 4 can thus acquire its position with a minimum amount of power being consumed while it establishes its location. In this manner, GPS appliance 4 battery life is maximized. It should be noted that when the GPS appliance 4 is first switched on at the beginning of a mission, it will go through one normal GPS position acquisition cycle, acquiring ephemeris data in the conventional manner.

The security device 2 can notify a user, at the operations control center 30, for example, of a security related event. Security events are defined prior to a mission. Security events may include tampering with an asset or a container 14 or passage of an inordinate amount of time during the mission or a battery level which may signal imminent battery depletion. The sensors or other input means further described below are arranged to be responsive to security events. Sensing of a security event may be used to activate the GPS sub-system, and Satellite or Terrestrial Transmitter in the GPS appliance 4. As further described below, a preselected menu of information may be transmitted to the operational control center 30, or to another receiver. Information may identify a type of security event, identity of the container 14 and location of the container 14. Another feature of the security device 2 is a radio frequency identification (RFID) tag 7. RFID tag 7 functions as described immediately below, and functions in a frequency domain apart from that of the GPS appliance of FIG. 4.

Part of the Invention includes location-based security. The most notable location-based security method is RFID, or Radio Frequency Identification. Radio Frequency Identification has two component categories, tags and interrogators, and is generally limited to a 90-foot radius in good conditions because of the limitations of data capture. To function, by design, RFID Systems require special readers to "see" tagged items at a point of ingress/egress, or readers may be deployed as a matrix. The INCITS T20 Draft Standard, "Real Time Locating Systems (RTLS)" defines RFID Components for Asset.

Management using a system of transmitters that "blink" a Direct Sequence Spread Spectrum (DSSS) signals to fixed readers providing an approximate location. The standard is not applicable to unbounded deployment areas as with monitoring transportation vessels; it enables users to locate assets within the range of a compatible permanent-reader infrastructure. Electronic Seals are now common with cargo containers; they are meant to deter unauthorized access and display non-erasable evidence of tampering, but the destruction of the device will never trigger an alert and in some situations they only provide evidence of tampering by their observed absence.

A security device requires a reasonable means of physical defense to restrict access, and a component to alert users to of tampering. One such method is described by Long in U.S. Pat. No. 5,648,763 where a mobile container latching mechanism is tied to a comparator and a GPS or LORAN system compares actual position to a preprogrammed location. The system permits access only when a container is at preprogrammed location; it is limited in that it is unable to transmit any alerts or violations.

Additionally, embodiments of the invention provide a platform for virtually any wireless Programmed Logic Control (PLC), Supervisory Control and Data Acquisition (SCADA) for controlling a Remote Terminal Unit, or monitoring remote sensory equipment. Due to the nature of the device, a wireless yard management system can be created based upon Wi-Fi, or a 2.4 GHz ISM-based Legacy System. The addition of sensors extends basic functionality; alternative functionalities include scheduling strategies for monitoring a sensor matrix, or data logging push-technology Smart Sensors.

The wireless link between a device and end-user is only one part of a Secure System; assurances are still needed by a Trusted Third Party Services Enterprise, and embedded security requires planning to avoid legacy issues during the product's life cycle. The device enables Asset Management Access Control with visible Supply Chain, and can resolve the 300 year-old Maritime Insurance Chain of Custody paradox Yard management strategies are trouble-free with interoperable Wi-Fi (Wireless Fidelity) that can use wireless communication via compatible Access Points (APs); alternatively, embodiments of the invention may be reconfigured to support legacy or emerging technology. The can be integrated with a Secure GIS Database, becoming a key component for secure Supply Chain Management. The device complements Role Based Access Control (RBAC) systems, and is designed to help IT Managers, allowing only authorized individuals to access hardware. It is apparent that devices must not only provide end-to-end security protection, they must also meet low-power requirements, and be "technology transparent" to the end user. More advanced security systems not only need to determine asset condition and location, but also are expected to provide user authentication, authorization and accounting, generally referred to as "Triple-A."

FIG. 2 is a partial detailed view of a container 14 protected by a security device 2. In the present illustration, the container 14 has doors 41 and 42 which support locking bars 43 and 44 respectively. The locking bars 43 and 44 secure the doors 41 and 42 in a well-known manner. In the present embodiment, the security device includes a tamper-evident closure member wire rope 50 further described with respect to FIGS. 7 and 8 below. Prior to a mission, the wire rope 50 is wrapped around the locking bars 43 and 44 so that the doors 41 and 42 cannot be opened without breaking the wire rope Ends of the wire rope 50 are secured in the housing 3. Many other forms of tamper-evident sealing of a container are well known in the art and could alternatively be used.

The security device 2 may be powered by its own battery. Additionally, power-recharging socket 60 could be provided to which the security device 2 may be connected. While the power-recharging socket 60 could be a conventional continuous power supply, the container 14 will often be in a location where this will be impractical. The power-recharging socket 60 may be built into the container 14, for example at the door 42. Energy storage means 62 are connected to the power-recharging socket 60. In the present example, the energy storage means 62 comprises a bank of ultracapacitors.

Figure 3:
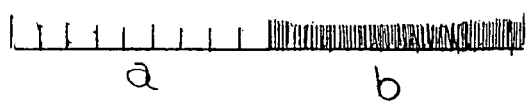
FIG. 3a is an illustration of the Consultative Committee for Space Data Systems (CCSDS) Packetized Telemetry Protocol Data Unit (PDU) and FIG. 3b is and Example Telemetry Message.

FIG. 3 consists of FIG. 3a and FIG. 3b. FIG. 3a is an illustration of transmission of the 50 bps GPS Broadcast ephemerides within the GPS signal. FIG. 3a represents the continuous GPS transmission. FIG. 3b represents the IGU Ultra Rapid Orbit in the SP3 ASCII data format (the IGU signal). FIG. 3 is not to scale and is intended to illustrate qualitatively a difference in data rates between the GPS signal in space and the Ultra rapid product transmission over a telemetry link. The IGU signal, i.e., the Ultra rapid product signal, is derived from data collected by up to 51 IGS reference stations. This data is 50% measured and 50% predicted over the same time interval as the GPS master control station 26 data in space, which is predicted data. The IGU signal is termed rapid in that it is processed for immediate use rather being based upon a result of weeks of data reduction for precision surveying purposes need for the highest resolution GPS measurements. This designation of "rapid" is not related to the speed at which it may be transmitted.

In accordance with embodiments of the present invention, the IGU signal is successfully employed to derive and provide location information for the security system 1. As an alternative to receiving continuous GPS information the commercial satellite constellation 29 may broadcast a compressed form of the GPS broadcast ephemerides similar to the IGU signal. For purposes of the present description, the IGU signal or a signal produced to server as a substitute will be referred to as a time compressed ephemeris signal. It will also be referred to as a compressed GPS data payload.

Figure 4:
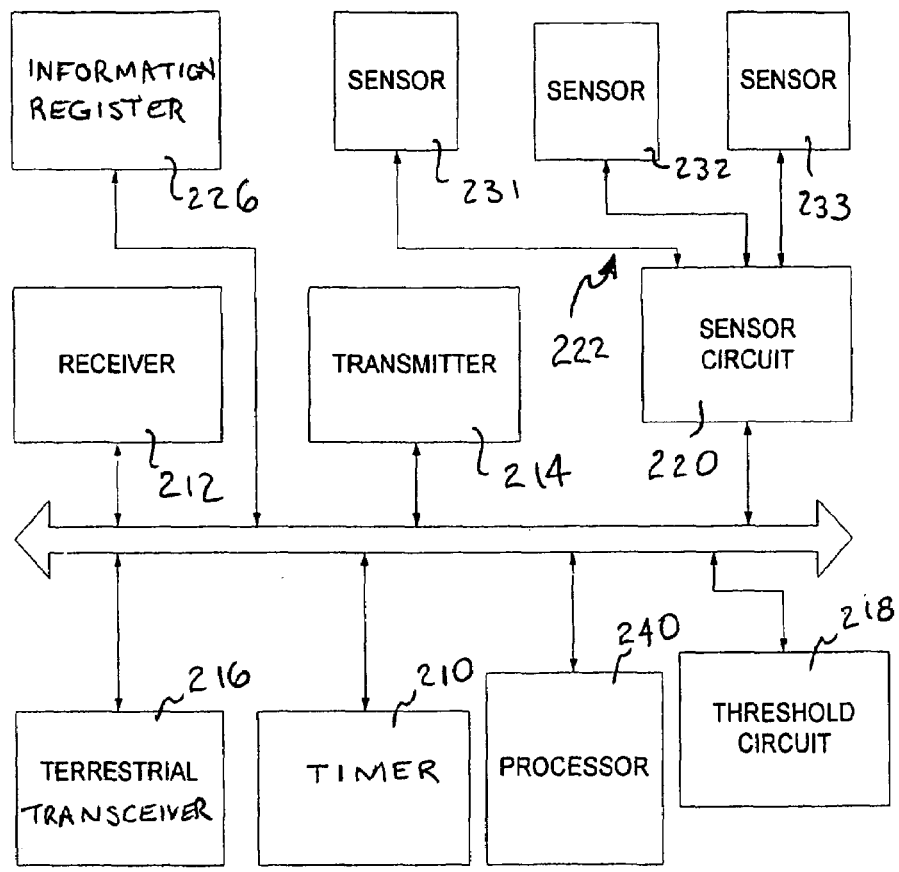
FIG. 4 is a block diagram of a security device comprised in the security system.

FIG. 4 is block diagram of one form of security device 2. Security device 2 includes a power source 200. In a significant percentage of foreseeable applications, the power source 200 is non-replenishable, such as the battery 8 (FIG. 1). Subsystems interact through a data bus 206. A timer 210, a GPS receiver 212, a Satellite Transceiver 214, a terrestrial transceiver 216 a threshold circuit 218, a sensor circuit 220 and a sensor array 222 are provided. Operations may be coordinated by a processor 240. Many different ways may be provided for implementing the present system. The illustration of discrete subsystems is done only for clarity of description. Various subsystems could be included in integrated microcircuit chips, embodied in the processor 240 or embodied in other known ways.

In one form of the invention, the sensor array comprises additional sensors connected wirelessly to the security device 2 by an embedded Wi-Fi "Piconet." This enables the system to automatically monitor sensors and send status information to the user. The security device 2 may also control a sensory actuator through which automated commands or a remote-user may override the system to provide direct commands.

A good example of this case is a refrigeration container with a 4-wire interface; the Invention can be programmed to send sensory temperature information periodically or when temperature is outside a specified mean. The user will be notified of deviations, where sensory information has exceeded a mean in the form of a short message from the device delivered via satellite; the user can transmit command signals attempting to remotely resetting the refrigeration unit.

The GPS receiver 212 is normally in an inactive mode. The timer 210 is set in the preferred embodiment to turn on the receiver 212 for a scheduled and prescribed period of time to transfer a compressed form of broadcast ephemeredes and then to turn the receiver 212 off. The processor 240 produces control signals to control the sate of the receiver 212 in response to timing signals from the timer 210, which act as commands. In this manner, the GPS appliance 4 is enabled to respond at a time when a time-compressed ephemeris signal, is being broadcast. A complete ephemeredes data block, representing the entire GPS Constellation, is received within a few seconds, in contrast to the 50 bps GPS performance. Consequently, time during which the power source 200 must power the receiver 212 is minimized.

A satellite, such as a commercial satellite 28 can be provided which provides a compressed GPS data payload upon request from the GPS appliance 4. In this case, the timer 210 operates to enable a temporary, synchronous link between the GPS appliance 4 and the commercial satellite constellation 29. A time period is also set to allow authentication of a GPS data payload. If receipt of the data payload is not detected, the timer 210 sets a time period to reattempt a failed transmission of a GPS data payload. The GPS appliance 4 provides a control signal to return the Satellite Receiver to a stand-by mode upon authentication of the GPS data payload. Also, a control signal is provided to return the receiver 212 to a stand-by mode after a predetermined interval where signals from the satellite constellation are unavailable.

The receiver 212 may provide location information to an information register 226 to have location of information available for the transmitter 214 where the transmitter is energized. Additionally, an information register 226 is also coupled to the data bus 206. The information register 226 preferably includes manifest information such as the identity of the security device 2. Other information such as the nature of the contents of the container 10 may be coded and stored in the register 226. The register 226 may be embodied in one or a plurality of registers which could be distributed between the transmitter 214, sensor array 222 or arranged otherwise to provide the specified signals.

The sensor array 222 may include individual sensors such as sensors 231, 232, and 233. Each of the sensors may be selected to respond to a particular class of event that is desired to report to the operational control center 30 (FIG. 1). For example, the sensor 231 could comprise an accelerometer which produces an output when the container 14 (FIG. 1) is displaced linearly, when it is intended to remain stationary; when a damaging impact is measured against a threshold value; or if the container 14 receives some other form of sufficiently strong impulse. A sensor 232 could sense breach of the locking means 12 on the container 14. The sensor 233 could include any form of transducer including, but not limited to, radiation, smoke, gas or temperature detection to indicate a catastrophe such as a fire.

In response to responding to a condition, the sensor array provides a threshold signal to the threshold circuit 216 and provides and information report to the information register 216 indicative of the type of condition sensed. The type of condition sensed may simply be reported by reporting the identity of the particular sensor 231–233. In response to sensing the condition, the threshold circuit turns the transmitter 214 on to send a communication to a user or operational control center 30 indicative of the occurrence of the sensed condition. The operational control center 30 will receive a signal indicative of location of the container 14, the condition sensed and manifest information. In one preferred form, the location of the container 14 is only updated at times of broadcast of time compressed ephemeris signals, or as a result of a sensory event, rather than on the order of 12 times a day. This provides for fewer a posteriori check-in intervals for Chain-of-Custody traceability. However, the Time-to-First-Fix performance is in the order of two seconds, and provides accuracy generally exceeding the GPS-SPS accuracy. Rapid GPS acquisition or reacquisition performance requires an accurate real time clock (RTC) by using a stable frequency reference, to better than 1 ppm at a minimum, generally provided by a Temperature Compensated Crystal Oscillator (TCXO). A TCXO may also be pre-aged so that TCXO aging error becomes a predictable linear influence that can be compensated by a simple digital signal processing (DSP) rate algorithm.

The GPS appliance's operational profile, and the appropriate power budget, are intended to suit an operational need as with container 14 aboard a slow moving vehicle, for example the ship 18 (FIG. 1), resolution will be sufficient for reporting purposes.

Should a unique or special case arise where very rapid acquisition is expressly required, as for life safety purposes, ephemeris intelligence can be directly coordinated with the GPS master control station (MCS) 26 as appropriate. As with a special case, the receiver 212 stores the MCS ephemeris data in the same fashion as mentioned previously. Legitimate MCS data will provide a positive fit interval flag thereby enabling the use of data for PVT calculations. GPS Satellite Ephemerides are calculated by accurately predicting future GPS Satellite orbits on the basis of a curve-fit to four to six hours of actual orbit data. A fit interval flag is set to zero when the space vehicle (SV) is operating normally. The fit interval is measured by comparison of space vehicle pseudorandom number codes (SV PRNs). By matching SV PRN sequences and confirming interval flags, the GPS receiver 212 may determine that it is relying on current data. More specifically, the parameter $t_{oe}$, the epoch reference of the ephemerides in seconds, of the current GPS week is confirmed. Consequently, it is known that the current IODC and IODE, issue of data, dock and issue of data, ephemeris have been obtained. Therefore, the received data can be used for immediate PVT, position-velocity-time, calculations. Since a complete current set of data is used, "cut-in" of mixed ephemeris age data is avoided. While methods exist to bypass the fit interval flags for "instant" PVT calculations, significant position error may be introduced because positioning error grows in proportion to the square of epoch-time. An added benefit to the invention and method described, averts the effectiveness of attempts to introduce incorrect ephemeris data or timing information spread onto the GPS Signal by a malicious parties.

Figures 5, 6:
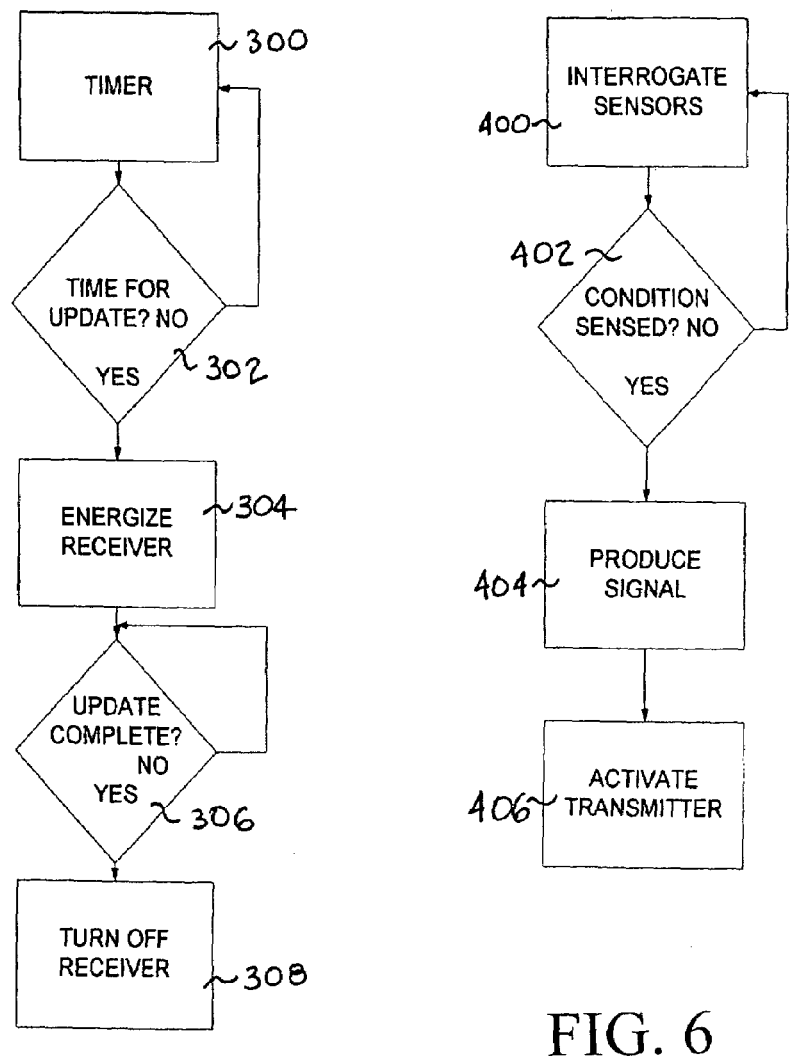
FIG. 5 is a flow diagram illustrating the process of updating satellite position.
FIG. 6 is a flow diagram illustrating operation of condition-responsive sensors and the transmitter of the remote unit of FIG. 4.

FIG. 5 is flow chart illustrating the operation of the remote unit 1. At block 300, the timer 210 is in operation. At decision block 302, the current time is compared to the scheduled update times. If it is not time for an update, operation returns to the timer block 300. When an update time is reached, the receiver 212 is turned on at block 304. Timing is monitored at block 306 to determine if the transmission period for the GPS data payload transfer is completed. If not, the receiver 212 remains energized. When the update period is completed, at block 308, the receiver 212 is turned off.

FIG. 6 is an illustration is operation of the transmitter 214. At block 400, the sensor circuit 218 interrogates the sensors 231–233. At block 402, outputs of the sensors 231–233 are each compared to a reference value indicative of a condition. If a condition is sensed, the sensor circuit 218 provides a signal to trip the threshold circuit 216. If not, operation returns to sensor interrogation. When the threshold circuit 216 is tripped, the transmitter 214 is energized, at block 406. The threshold circuit may include a circuit to keep the transmitter 214 transmitting continually until the battery 201 wears down or may cause the transmitter 214 to produce one transmission of affixed duration or may produce a plurality of transmissions each of fixed intervals and duration. Of course, there are many well-known alternatives to interrogating sensors 231–233 by the sensor circuit 218. Alternatively, an analog circuit responding to change of state of sensor could be used. The mechanics of condition sensing are well known and do not form part of the present invention.

While the IGU SP3 ASCII Format is a preferred source of location update information for the GPS 212 receiver, embodiments could be provided in which another source is utilized. The IGS, for example, could at some future date provide a different ASCII, truncated or compressed binary formats, which would minimize battery requirements for rapid location updates. Alternatively, a third party may emulate the data from the GPS Signal-in-Space, producing a highly compressed GPS data payload from an existing Format for transmission to remote GPS appliances 1. For purposes of description, the term accelerated GPS data payload will be utilized to describe either the IGU data or a substitute data payload intended to update the GPS receiver 212 with minimal drain on the battery 201.

FIG. 7 is an axonometric illustration of a security device 502 comprising a housing 505. The housing 505 may comprise high-impact resistant polymer. The housing 505 may have a keypad 522 on an upper surface thereof communicating with a circuit such as that of FIG. 4 housed in the interior of the housing 505. The housing 505 houses circuitry on one or more circuit boards 508. The security device 502 may also comprise a power pack 510. The power pack 510 includes energy storage means such as batteries and/or ultracapacitors. A printed circuit antenna card 512 also housed in the housing 505 may include antennas for GPS communication, terrestrial communication and wireless links.

This assembly is designed for simplified user operation while providing a high degree of tamper resistance. The device presents a highly secure method of two-factor user authentication by requiring an Electronic Token and a Personal Identification Number (PIN) for arming/disarming sequences to be entered on the keypad 15. The sequence is possible due to a two-part secure hashing algorithm known HMAC (Keyed-Hashing for Message Authentication). The first digits are proprietary, the second group of digits represents a personal PIN individually assigned to each operator. The keypad 522 is interfaced to the processor 240 by the data bus 206 (FIG. 4). Entered digits are analyzed with the Token by an algorithm to provide a true/false element in one form. Sequential number "guessing," or repeated incorrect attempts, will lock the device for a set period of time during the disarm sequence. Alternatively, codes may be entered by an appliance, e.g., a cellular smartphone, with the common terrestrial link 242 (FIG. 4) which could be a Wi-Fi or other form of interface.

Therefore, positive identification sufficient under European and North American laws is provided of the party who sealed the container 14. Account and User Activity Logs are established in the processor 240 and can then be maintained by a Trusted Third Party Services Enterprise, providing User IDs with time and date stamped activity as a means of non-repudiation for auditing malicious activity. The housing 505 captures ends of a wirerope 524 after the container 514 is sealed. When the container 14 (FIG. 1) is sealed, the wirerope 512 is threaded through apertures 516 and 517 of mating sections 518 and 519 respectively of the container 514. The container 514 cannot be opened without cutting the wire rope. The keypad 522 may be used to enter codes for a number of functions. Codes may be entered by authorized user to "arm" the security device 502 at the beginning of a mission, to enable an authorized user to mechanically release the wirerope 524 at the end of a mission without triggering a security event, to change factory default "wake" intervals or provide other functions.

FIG. 8 is a cross sectional illustration of the wirerope 524. The wirerope 524 comprises a fiber optic cable 526 surrounded by cable strands 531. The fiber optic cable has an optical core 528 and a protective layer 529. The wire rope 524 may comprises six cable strands 531 surrounding the fiber optic cable 530 in a hexagonal pattern. The strands 531 may in turn comprise seven strand hexagonal cable comprising strands 534. In one form, the strands 534 comprise ASTM A475 steel.

Figure 9:
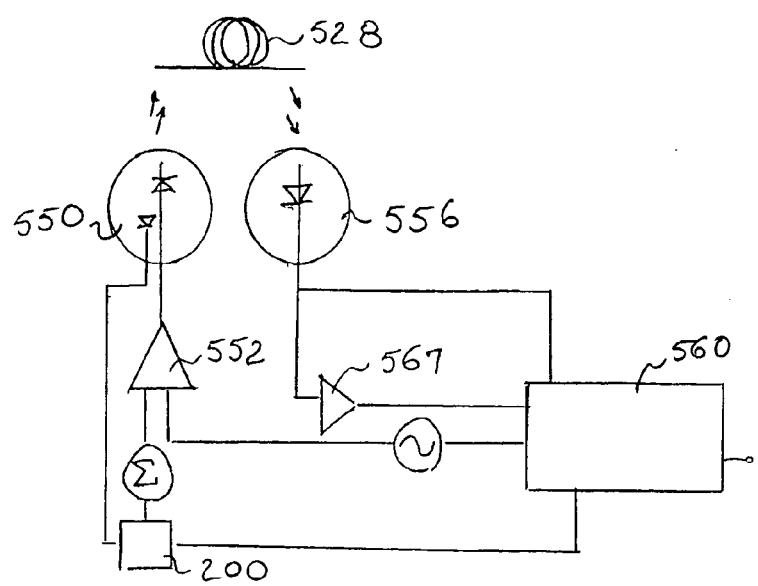
FIG. 9 is a block diagram of a sensor circuit responsive to cutting of the wirerope.

FIG. 9 is a block diagram of a sensor circuit responsive to crushing or attempts at cutting of the wirerope 524. The wire rope 524 provides two forms of security; physical security by means of locking as seen in FIG. 2 and anti-spoof monitoring to detect cable integrity breaks. The wire rope 524 is in a closed loop sensor with a transmitter, fiber optic cable, and a receiver. Cutting of the wire rope 524 would constitute a security event, done without entry of an authorization code at the keypad 522. A radiation source 550, which is preferable a laser light source, is powered by a driver 552 which may be supplied by the power source 200 of FIG. 4. Light from the laser light source 550 is coupled by the fiber optic cable 528 to a photodetector 556 to provide an output to a sensor circuit 560. Preferably, a comparator 562 is coupled to receive an output from the photodetector 556 and the input to the driver 552. This enables the sensor circuit 560 in response to lack of an output signal from the photodetector 556 to distinguish between a failure in the path of the fiber optic cable 528 and a failure in the supply to the light source 550. In one suitable form, the light source 550 comprises a Vertical Cavity Surface Emitting Laser (VCSEL) module also including a monitoring photodiode. The sensor circuit 560 provides a sensory interrupt signal at a terminal 564 in the event of failure of the output of the photodiode 556. Logic circuitry responsive to the outputs of the comparator 562 and the photodiode 552 provide a coded response indicative of the failure mechanism.

Figure 10:
FIG. 10 is a block diagram of a sensor circuit for responding to a transducer such as an accelerometer.

FIG. 10 is a block diagram of a sensor circuit for responding to a transducer such as an accelerometer. When an object is supposed to remain stationary it is very difficult for a GPS System to determine this with confidence; generally an object has to be moved a significant distance for the motion to be observed from random signal correlation. All functions use stochastic principals for providing a high degree of confidence; the primary sensors for the invention provide a degree of intelligence by using an autocorrelation function with a priori data for determining the randomness of measurements to deterministically ignore white noise. Therefore, an embodiment of the invention includes a transducer 600, which may be a single-axis accelerometer for quantifying impact and relative motion; ($3\sigma$) 99.73% thresholds can be cross-correlated to determine event significance with exceptionally high confidence. The accelerometer history is Gaussian, Grms acceleration ($1\sigma$) provides a statistical history of acceleration. Root-Mean-Square Acceleration can quantify random vibrations, with 3 Grms ($3\sigma$) or "99.73% Confidence" only exceeded theoretically in 0.3% of all measurements. For a stationary object, a "near-zero mean" satisfies the case of remaining stationary. If random, such autocorrelations should be "near zero" for any interval; if non-random a reiteration will be significantly non-zero (signifying dynamic displacement or physical movement). A Kalman Filter Algorithm gives the invention the ability to interpret and filter dynamic white noise; an interesting feature for this filter is that unrelated sensors may be tied together in a manner called Sensor Fusion.

The accelerometer 600 provides an input to a buffer amplifier 604. However, other transducers may be used to indicate such other parameters as temperature, sound level or any number of parameters. A reportable event could include an impact of a preselected level sensed by an accelerometer, a temperature level or other condition which may be sensed by a transducer. The buffer amplifier 604 provides an input to a transducer-responsive processing circuit 606 having an output terminal 607. In the case of an accelerometer, preferably, the amplifier 604 provides an ac signal output. The transducer-responsive processing circuit 606 may comprise a Field Programmable Gate Array (FPGA), a pipelined Fast Fourier Transform (FFT) or an Auto-Zero Amplifier. In another embodiment, a transducer, e.g. a thermistor, could be included in a conventional direct current output circuit, and the transducer-responsive processing circuit 606 could comprise a simple threshold circuit. The transducer-responsive processing circuit 606 stores a signature indicative of a reportable event and provides an interrupt signal in the case of a reportable event at the output terminal 607.

Figure 11:
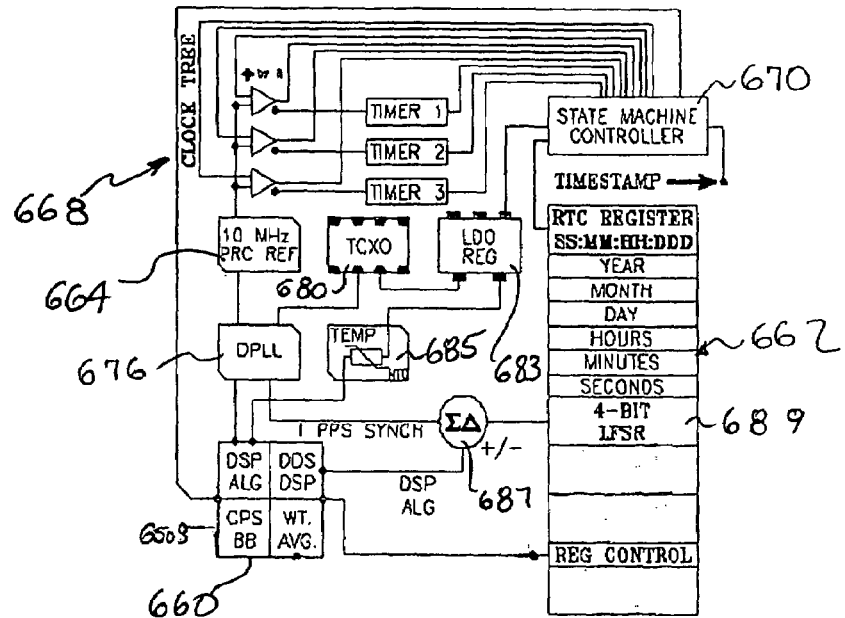
FIG. 11 is a block diagram of is a block diagram of a timing circuit which produces timing signals and a time stamp.

FIG. 11 is a block diagram of a timing circuit which produces timing signals and a time stamp. The circuit of FIG. 11 complies with RFC3161 Time Stamping Protocol, also known as Internet X.509 Public Key Infrastructure Time-Stamp Protocol (TSP), the Internet Society, 2001. This protocol provides for a trusted time stamp. In the circuit of FIG. 11, an ephemeris signal is received at an input terminal 650 from the receiver 212 (FIG. 4). The ephemeris signal is supplied to a digital signal processor 660. A first output indicative of GPS time is supplied to a time register 662 to update the time. Time is kept between updates in conjunction with a 10 MHz primary reference dock 664. The primary reference clock 664 provides an input to a dock tree circuit 668. The clock tree circuit 668 provides a plurality of outputs to a state machine controller 670. In this illustration, the dock tree circuit is providing the function of the timer 210 of FIG. 4. The dock tree circuit includes a number of frequency dividers which each comprise a timer for one periodic function, for example activating the receiver 212 (FIG. 4). Actual switching of timed functions is performed in conjunction with the state machine controller 670.

The primary reference clock 664 is coupled to a digital phase locked loop 676 which receives a reference frequency input from a temperature controlled crystal oscillator (TCXO) 680. The TCXO 680 is connected in a loop with a low dropout regulator (LDO REG) 683 and a thermistor circuit 685. The LDO REG 683 is also coupled to the state machine controller 670. The digital signal processor 660 produces a temperature compensated clock signal provided to a summing circuit 687. The summing circuit 687 also receives an input from the digital phase locked loop 676. The error signal at an output of the summing circuit 687 is provided to a linear feedback shift register 689 in the time register 662 to update the time.

Embodiments of the present invention can greatly reduce time in transit for containers. Where a recognized, trusted party has sealed a container the container need not be removed from the stream of commerce and quarantined until it can be inspected. Time is saved both a ports of entry and at border crossings.

The specification will enable those skilled in the art to make many modifications in the particular embodiments disclosed to provide a method and system in accordance with the present invention. Embodiments of the invention can be varied in many ways. Such variations are not to be regarded as a departure from the spirit and scope of the invention, and all such modifications are intended to be within the scope of the invention.

What is claimed is:

1. A method for acquiring GPS satellite position comprising:
    maintaining a GPS receiver in a stand-by mode;
    selecting a time at which a compressed GPS data payload is to be transmitted;
    setting the GPS receiver to an active state at the predetermined time; and
    returning the OPS receiver to a stand-by state after an interval having a length selected to download the compressed GPS data payload.

2. The method according to claim 1 wherein selecting a time for transmission of compressed GPS data payload comprises selecting a time for transmission of IGU data or a substitute GPS data payload.

3. A GPS appliance comprising a GPS receiver having a control to set said receiver to an active state or a stand-by state; and
    a timer coupled to said control;
    said control normally providing a signal to set said GPS receiver to the stand-by state, said timer being set to activate said control to set said GPS to an active state at a time corresponding to time transmission of compressed GPS data payload by a selected satellite constellation.

4. The GPS system according to claim 3 further comprising means for returning said GPS receiver to the stand-by state after a time interval allowing downloading the compressed GPS data payload.

5. The GPS receiver according to claim 4 wherein said timer is set to provide:
    a means for enabling a temporary, synchronous link between said GPS appliance and a commercial satellite constellation;
    a time period to authenticate a GPS data payload;
    a time period to reattempt a failed transmission of a GPS data payload; a control signal to return the Satellite Receiver to a stand-by mode upon authentication of the GPS data payload; and
    a control signal to return the Satellite Receiver to a stand-by mode after a predetermined interval where Satellite Availability is not possible.

6. A GPS Appliance comprising a GPS receiver, a transmitter, at least one condition-responsive sensor, a register for providing information to be transmitted in response to sensing of a condition by said condition responsive sensor, a timer to set said GPS receiver to an active state at a time to receive a GPS receiver in response to receipt of a GPS data payload, the threshold circuit to activate said transmitter in response to occurrence of a condition sensed by a sensor, said transmitter including means for transmitting position information and information from said information register.

7. A remote unit according to claim 6 wherein a register stores manifest information.

8. A remote unit according to claim 7 comprising a plurality of sensors, each sensor responsive to a different condition.

9. A remote system according to claim 8 wherein said timer is set to enable said GPS receiver to respond to a compressed GPS data payload.

10. A security tracking system comprising a remote user interface or Operational Control Center and a remote GPS appliance according claim 6.

11. A security system according to claim 10 wherein a register stores manifest information.

12. A security system according to claim 11 comprising a plurality of sensors, each sensor responsive to a different condition.

13. A security system according to claim 12 wherein said timer is set to enable said GPS receiver to respond to a source of time-compressed ephemeris data.

14. A GPS appliance comprising a GPS receiver having a control to set said receiver to an active state or a stand-by state; and a timer coupled to said control;
    said control normally providing a signal to set said GPS receiver to the stand-by state, said timer being set to activate said control to set said GPS to an active state at a time corresponding to time transmission of compressed GPS data payload by a selected satellite constellation; and further comprising access control via user authentication, said access control comprising a storage location to store programmed authorization identification and a processor to determine entry of an authorized code.

15. A GPS appliance according to claim 14 wherein said access control comprises access to change a state of said receiver between an off state to the active state or a standby state.

* * * * *